July 13, 1926. 1,592,672
C. R. NICHOLS
PROCESS OF APPLYING ACCELERATORS TO CEMENTITIOUS PLASTIC MASSES
Original Filed Oct. 28, 1925   2 Sheets-Sheet 2
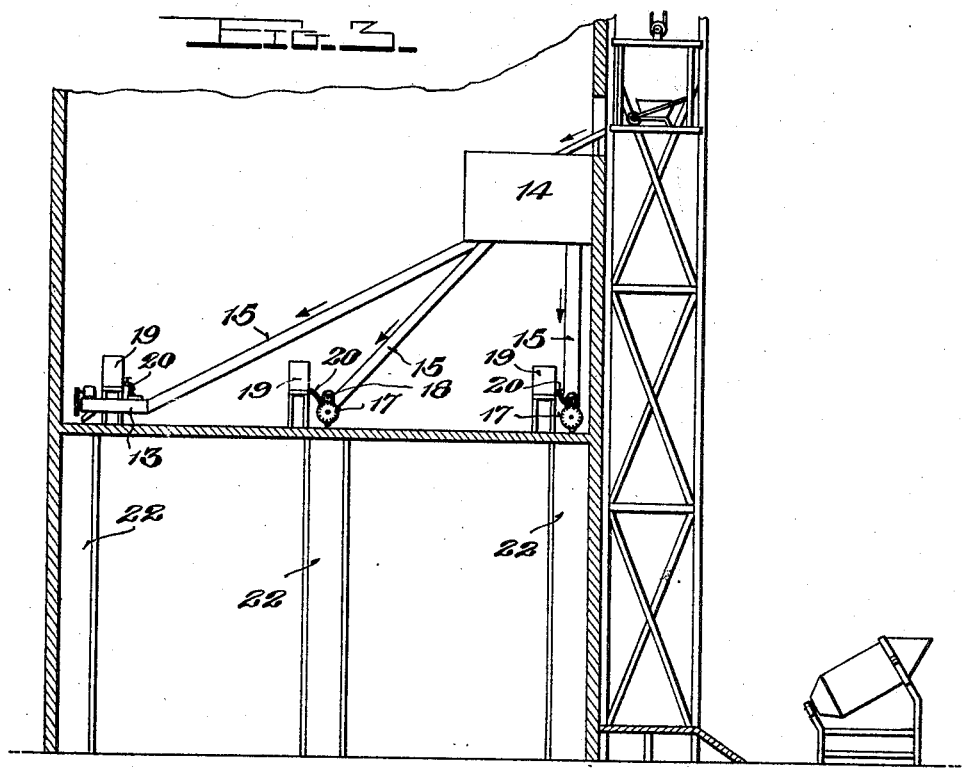
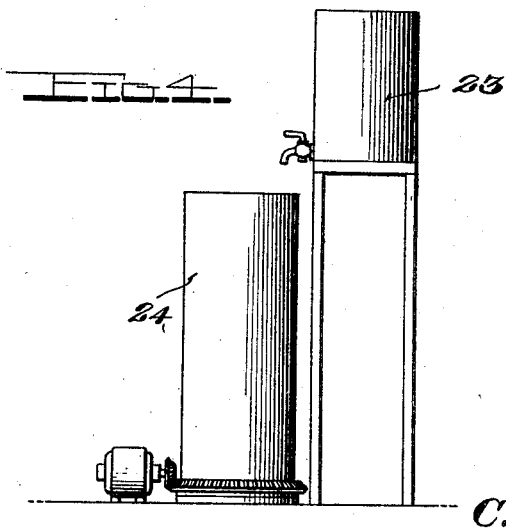
Inventor
C. R. Nichols,
By G.C.Waldrop
Attorney Patented July 13, 1926.

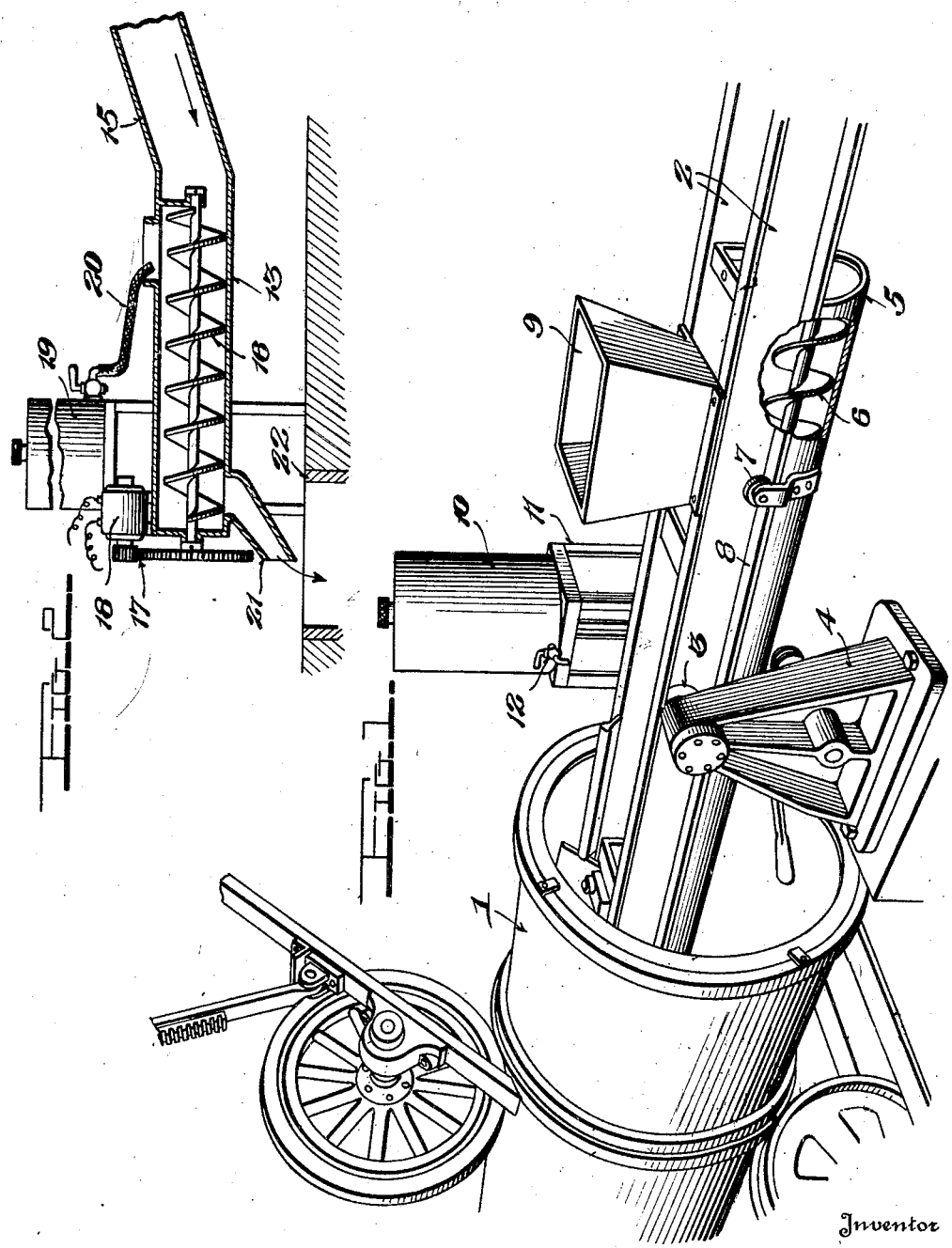

1,592,672

UNITED STATES PATENT OFFICE.

CLIFFORD R. NICHOLS, OF DETROIT, MICHIGAN.

PROCESS OF APPLYING ACCELERATORS TO CEMENTITIOUS PLASTIC MASSES.

Application filed October 28, 1925, Serial No. 65,482. Renewed June 8, 1926.

This invention relates to cementitious products and methods of forming or casting the same and deals particularly with agents for accelerating, setting and hardening of such bodies.

Heretofore, as far as I am aware, manufacturers in using concrete materials, have been handicapped in methods for uniform hardening and curing. In certain classes of construction work, such as reinforced buildings, pipe and block making and the manufacture of small concrete articles, various efforts have been made to attain uniform strength and early hardening, not attainable by the use of commercial Portland cements, for example moist steam, water, steam under pressure and the use of various chemicals, such as calcium chloride. These chemical compounds, as accelerators, aided materially in attaining early strengths and the uniform curing of the concrete mass or article formed. However, in the use of accelerators it has been the usual practice to mix same with the concrete during preparation of the latter. Considerable trouble was encountered in this method, due to unexpected delays, such as shutdowns, etc., which retarded the delivery of the mixed concrete to final placement within the form. As a result of this delay, the accelerating agent having started its work before the final placement, causes considerable difficulty in removal of the wasted material from, and cleaning of the delivery and mixing means.

It is a recognized fact based upon laboratory and field practice, observation and tests, that when concrete carrying an accelerator is placed in its conforming form before hydration starts, great advantages are secured in earlier hardness, strength and a uniformity of product, and the early release of the conforming members without the use of steam or other curing agents.

There are a number of known accelerators which may be readily obtained, however, there is a general opinion among operators in the cement and concrete arts that the hazards incident to delay after mixing the accelerator with water, cement and aggregate, offset the advantages obtained by the use of an accelerator, therefore, it is not used as extensively as it would be if this hazard were overcome.

Some have used an accelerator in small quantities in an effort to avoid a part of the hazards and at the same time receive the benefits of even a very limited acceleration of the setting of the mass.

I have, in practice, discovered that by mixing the requisite amount of water to complete the hydrating or setting of the cement with the ordinary commercial cement and aggregate in the usual manner and then thoroughly impregnating the plastic mass with an accelerator instantly at the point of final placement, that I am able to obtain all the benefits of an accelerated setting or hardening of the mass and avoid all the hazards ordinarily encountered. Furthermore, I am able to use any desired or permissible quantity of accelerator without any of the hazards incident to delay in final placement of an accelerated mass.

It has heretofore been entirely impractical to use an accelerator in connection with a cementitious agglomerate in the making of pipes, columns and the like, or in the erection of buildings and structures due to the time neccessary to convey, transport and place the mass after mixing. In such cases should an accelerator be used in such quantity as to materially hasten setting or hardening, the hazard incident to handling the mass was too great; on the other hand, the use of smaller amounts of accelerator availed little or no practical benefits.

Under outside or exposed conditions during cold weather the manufacturers of concrete products must protect the mass after placement against freezing. Even cold temperatures, although above freezing, retard and delay the setting of the body, and in the construction of buildings great expense is necessary in temporary wall structures of canvas, lumber and the like, as well as maintaining temperature control about the setting body by steam or other heat.

It is well known that when some accelerators are mixed with a mass containing Portland cement and water, that heat is generated within the mass, such action beginning almost instantly upon mixing the accelerator with the mass. It is very desirable therefore, to conserve all the energy and heat within the mass as an aid to early setting and a protection against frost and freezing until after the body has set.

In referring to the generation of heat in the foregoing it must be understood that while I am aware that some accelerators do not generate or cause heat of any appreciable degree within the accelerated mass, when used in quantities permissible in ordinary commercial practices, there are others whose energies are more perceptible.

Also the actions of accelerated masses containing different cements or cement ratios are different. It is the safest practice in the ordinary use of accelerators to take all usual precautions against frost or freezing, however such precautions may be safely dispensed with at a much earlier time than where an accelerator is not used.

This invention contemplates that by mixing with or permeating the mass by an accelerator just prior to the time and adjacent the point of final placement of the accelerated mass that none of the hazards of clogging the machinery of mixers or conveyors exists and likewise none of the energy or heat or other beneficial results of the accelerator are dissipated by handling of the mass after the accelerator is mixed therewith.

By the practice of my invention, as will be apparent, I am able to use accelerating agents and secure all the benefits incident thereto or resulting therefrom in a simple and practical manner, without any of the hazards heretofore encountered.

The utility of accelerating agents being well known, the novel and useful means and their ready use in practicing my invention may be easily understood from the following description, together with the accompanying drawings, wherein;

Figure 1 is a fragmentary perspective view of one form of applicator or mixer for practicing my invention, Figure 2 is a side elevation, partly in section of a supplemental mixer showing another mode of use of the invention.

Figure 3 is a diagrammatic view of a building construction illustrating the manner of use of the invention; and Figure 4 is a similar view of a further use of the invention.

In proceeding in accordance with the present invention 1, designates the rotary mold of the centrifugal pipe making machine disclosed in my Letters Patent No. 1,457,185, dated May 29, 1923. A sliding frame composed of a pair of side members 2 is mounted for movement longitudinally into and out of the mold, and is slidably supported on rollers 3 at each side of the frame. The rollers are carried by suitable standards 4. The frame constitutes a means for slidably carrying the material conveyor, which latter is composed of a trough 5 having a screw conveyor 6 journaled therein. The trough is supported for movement by means of rollers 7 that engage tracks 8 carried by the frame sides. The plastic material in a mixed condition is introduced into the hopper 9 that is mounted on the frame, from any concrete mixer.

At or adjacent to the inlet end of the mold, i. e., the end into which the mixed material enters, a tank 10 mounted on a frame 11 is disposed, the tank having a suitable outlet provided with a faucet 12 for controlling the egress of the accelerating agent. The faucet is positioned so as to cause the agent to be discharged into the plastic mixture synchronously with the entrance of such mixture into the mold.

In Figure 2 there is depicted an auxiliary mixer 13 which is used particularly in building construction. In building construction, it is the practice to initially mix the concrete on the ground, and to then elevate same into a main or distributing container 14 located above the placement points. Chutes 15 extend downwardly from the container to the respective points of final placement to cause the material to gravitate to such points and upon the extreme ends of such chutes the mixer of Fig. 2 is applied. This mixer embodies a screw 16 driven in any suitable manner for example by gearing 17 and electric motor 18. An accelerator containing tank 19 has a discharge 20 which leads into the mixer. The plastic mixture or mass entering the mixer comes in contact with the accelerating agent and is thoroughly mixed therewith, and then egresses through the mixer discharge 21 and from the latter enters the molds or form 22.

It is therefore to be noted that the invention proposes in one aspect thereof, the supplemental mixing of the plastic mass with an accelerator just prior to the moment the mass enters the mold or form. This is of great importance, since it is not infrequent that long periods of time elapse, between the initial mixing of the mass and the pouring of the latter into the mold, or point of final placement.

While I have shown in Fig. 1, a horizontal type of molding machine, it will be understood that the machine mold may be vertically disposed as shown in Fig. 4 of the drawings, wherein the showing is schematic. In this figure 23 indicates the accelerator tank and 24 the mold.

It is known that in forming concrete bodies or structures, when hydration takes place the product is greatly injured unless sufficient water is present in the body or is supplied thereto. In using an accelerator it is therefore important that sufficient water be within the mass to supply the demands created by accelerated hydration and to this end I have found it good practice to have within the accelerated mass a surplus of water thereby insuring uniform hydration and hardness of the resultant product without subjecting the product to the hazards of what is commonly called burning.

While means have been shown for applying the accelerator, my invention contemplates the use of any means adapted to thoroughly mix with or cause permeation of the plastic mass by an accelerator just prior and adjacent to the final placement of the accelerated mass in its conforming member.

It will be understood by those skilled in the art that since I secure contact with and permeation of the mass adjacent to and at the instant of final placement, I can readily use any volume or strength of accelerator without danger to the mixing and conveying mechanism, or without delaying the placement of the accelerated mass in any manner. I, therefore, am able to conserve and utilize all the energy and heat producing benefits of accelerators and to control the setting of the mass to a very practical and beneficial degree.

What is claimed is:—

1. The process of treating cementitious agglomerates consisting of mixing therewith a set-accelerating agent adjacent the point of final placement of the agglomerate.

2. In the process of composing cementitious agglomerates, the steps of mixing therewith sufficient water to completely hydrate the free lime content of the agglomerate and bringing into contact therewith a set-accelerating agent which induces rapid hydration while surplus water is in contact therewith.

3. A process of molding cementitious bodies consisting of mixing with the agglomerate to compose the body sufficient water for hydration thereof, and in bringing into contact therewith adjacent the point of final placement an agent which will accelerate hydration.

4. A process of accentuating the temperature of a cementitious mass in its early setting stages by mixing therewith a set accelerating agent.

5. The process of treating a cementitious plastic mass which consists in initially mixing the mass to form a plastic mixture, and then effecting supplemental mixing of the mass and synchronously mixing therewith a set-accelerating agent adjacent the point of final placement.

In testimony whereof I affix my signature.

CLIFFORD R. NICHOLS.